United States Patent
Hinzmann et al.

(10) Patent No.: US 6,318,986 B1
(45) Date of Patent: *Nov. 20, 2001

(54) UNDERCUT SPLIT DIE

(75) Inventors: Gerd Hinzmann; Mark Haiko; Frank Ma; Allan Wilson; Keith Buckley-Golder; Robert Round, all of Mississauga (CA)

(73) Assignee: Stackpole Limited, Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/118,908

(22) Filed: Jul. 20, 1998

Related U.S. Application Data

(63) Continuation-in-part of application No. 08/495,462, filed on Apr. 18, 1997, now Pat. No. 6,099,772.

(30) Foreign Application Priority Data

Nov. 24, 1993 (WO) .................................. PCT/CA93/00505

(51) Int. Cl.[7] .................................................. B29C 43/02
(52) U.S. Cl. ..................... 425/78; 425/352; 425/354; 425/356; 425/408; 425/DIG. 35
(58) Field of Search ........................... 425/78, 352, 354, 425/356, 408, 444, DIG. 35

(56) References Cited

U.S. PATENT DOCUMENTS

| | | | |
|---|---|---|---|
| 3,020,589 | 2/1962 | Maritano | 18/16 |
| 3,752,622 | 8/1973 | Viadana | 425/78 |
| 3,773,446 | 11/1973 | Borrini | 425/78 |
| 3,775,032 * | 11/1973 | Smith et al. | 425/78 |
| 3,842,646 | 10/1974 | Kuhn | 72/354 |
| 3,891,367 | 6/1975 | Signora | 425/78 |
| 3,909,167 * | 9/1975 | Signora | 425/78 |
| 4,008,021 * | 2/1977 | Fedrigo et al. | 425/3 |
| 4,047,864 * | 9/1977 | DeSantis | 425/78 |
| 4,370,119 * | 1/1983 | Watanabe | 425/78 |
| 5,326,242 * | 7/1994 | Katagiri et al. | 425/78 |
| 5,698,149 * | 12/1997 | Hinzmann et al. | 264/120 |

* cited by examiner

Primary Examiner—Nam Nguyen
Assistant Examiner—Joseph S Del Sole

(57) ABSTRACT

This invention relates to a device to compact parts with an undercut out of powder material having an upper die moveable relative a lower die, at least one upper punch associated with the upper die for relative movement therebetween, at least two lower punches associated with the lower die for relative movement therebetween, the lower punches defining a lower cavity with the lower die for filling with the powder material when the dies are in an open position, the upper die contacting the lower die in a closed position for movement of one of the lower punches towards the upper die so as to transfer the powder material towards the upper die and then to compact the powder material between the upper and lower punches with said dies in the closed position so as to produce the part; the dies moveable to an eject position for ejection of the compacted part.

8 Claims, 5 Drawing Sheets

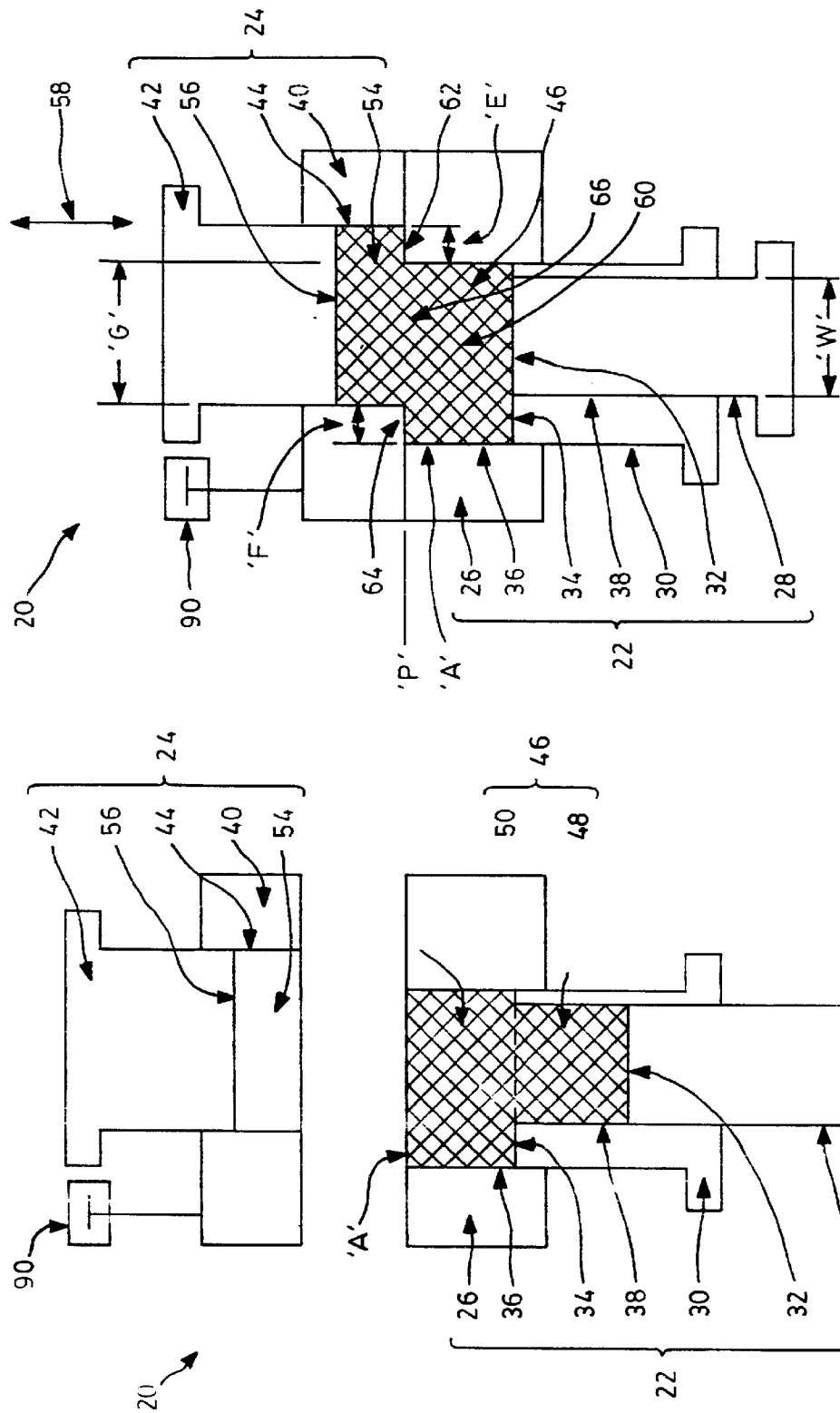

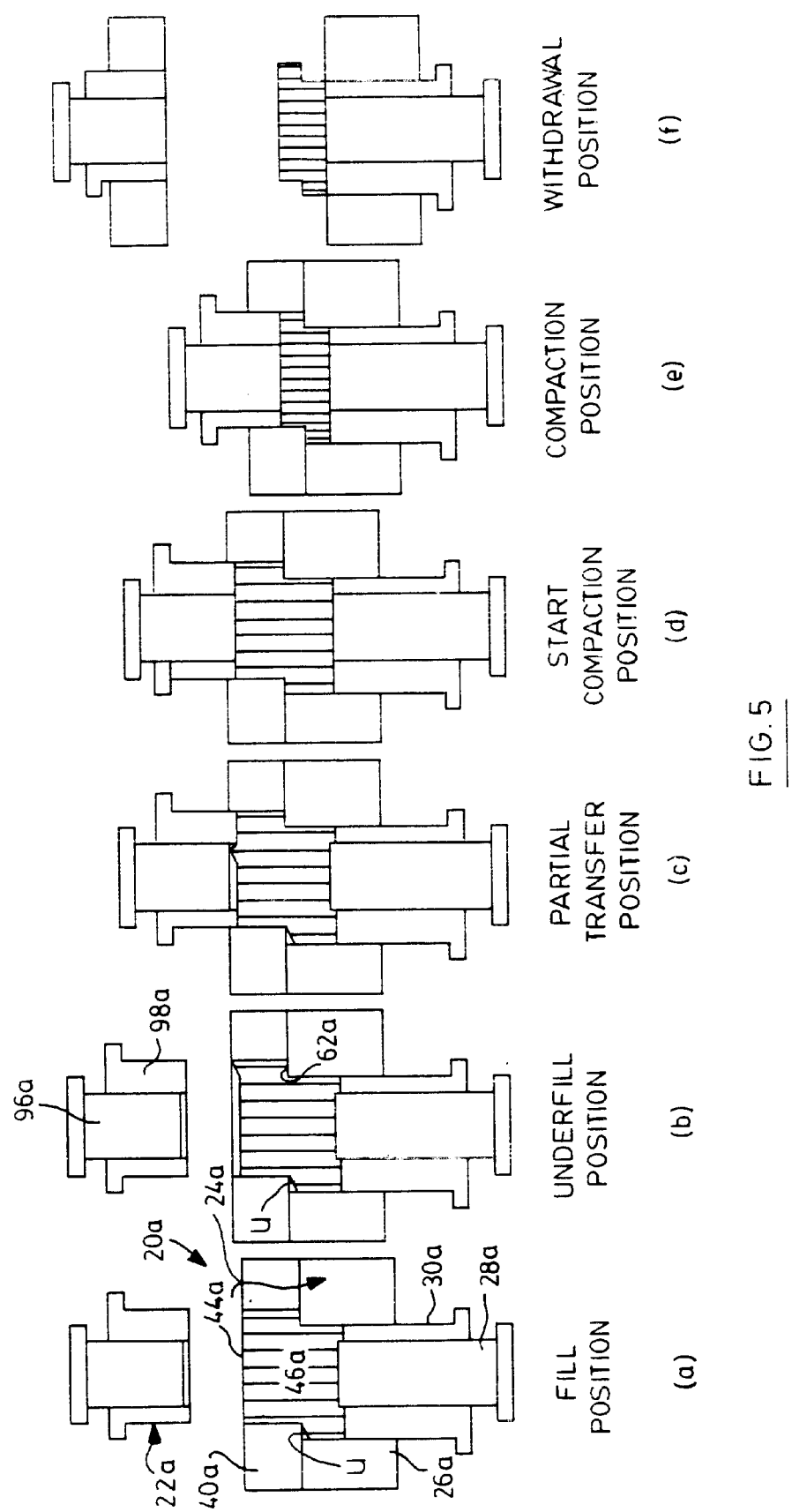

UNDERCUT SPLIT DIE

This application is a continuation-in-part of application of U.S. application Ser. No. 08/495,462 filed Apr. 18, 1997 now U.S. Pat. No. 6,099,772 which is a national entry of international application PCT/CA93/00505.

FIELD OF INVENTION

This invention relates to presses and toolsets for producing compacted parts out of powder material. More specifically it relates to a split die toolset.

BACKGROUND OF THE INVENTION

Devices to compact parts out of powder material for sintering are well known to those persons skilled in the art. In some cases, the compacted part has an undercut which prevents removal of the part or blank from the dies by linear or axial displacement.

Tool sets with split dies are known in powder material compaction to press parts into shapes that have an undercut in the compacting direction.

For example, U.S. Pat. No. 3,773,446 teaches a device for moulding parts to be sintered by compressing powdered material held between a fixed die and moveable die. A pair of punches extending through the dies compresses the powder material. A pressure plate operated by the punch extending through the moveable die engages the moveable die and is also locked to the fixed die during the compression so as to produce a part having an undercut.

U.S. Pat. No. 3,752,622 teaches a device for moulding blanks with undercut parts to be sintered by compaction of powder material.

The prior art teaches that both parts of the die are tied together while filling with a feed box that moves across the top of the dies for purpose of filling the cavity with powdered material. After compaction the upper part of the die moves away together with the top punch to eject the part.

One of the disadvantages of the known systems as referred to above relates to the fact that the upper part of the die has to be tied mechanically to the lower part of the die and the upper punch in an alternating mode, thus making a complicated tool rig necessary. This construction leads to a fixed fill height for the charge and so adjustments cannot be made to accommodate batch to batch variations. With undercut components it is necessary to ensure that powder is uniformly distributed in the die prior to compaction. The undercut areas of the component tend to inhibit flow of powder within the die and so may produce components with local zones of weakness. This non-uniformity is compounded by variations in the characteristics of the change of material so that variations in density of the powder after compression may occur.

It is therefore an object of this invention to obviate or integrate the above disadvantages to provide a device that is simpler to construct and more efficient to operate than heretofore known by the prior art.

In a first aspect of the invention there is provided a toolset for a powder molding machine comprising a pair of opposed die and punch sets each having a die and a punch co-operating therewith to define respective chambers, the sets being movable relative to one another from an open position in which the sets are separated, to a closed position in which the sets abut, with the chambers in closed communication to form a closed mold cavity, one of the punches being movable from a filling position, in which the respective chamber has a volume sufficient to receive a charge of powder to fill the cavity, to a transfer position in which the respective chamber has a reduced volume, movement of the punch between the filling and the transfer positions thereby transferring powder to the other of the chambers to fill the closed cavity.

In another aspect of the invention the pair of die and punch sets constitutes a first die and punch set and a second die and punch set; the one punch being a first punch of the first die and punch set, the die with which it co-operates being a first die of the first die and punch set, and the first die and punch set having, additionally, at least a second punch; and the first and second punches are slidably nested within the first die.

In still another aspect of the invention the dies and punches of the pair of die and punch sets are further movable to compaction and ejection positions, and, in each of the filling, transfer, compaction, and ejection positions each of the punches is in sliding engagement within the die with which it is co-operating.

In yet another aspect of the invention the die and punch sets are movable in a direction of reciprocation, and, in the closed position, one of the chambers is offset transversely to the direction relative to the other of the chambers.

In a further aspect of the invention, the dies and punches of the pair of die and punch sets are further movable to compaction and ejection positions, and, in each of the filling, transfer, compaction, and ejection positions each of the punches is in sliding engagement within the die with which it is co-operating.

In another aspect of the invention there is a press for compacting a part out of powder material, that press comprising: (a) first and second die and punch sets, the first set movable relative to the second set between open, closed, and ejection positions; (b) means for causing the first set to move relative to the second set; (c) the second die and punch set having a first die and a first punch engaged within the first punch for relative movement therebetween; (d) means for causing relative movement between the first punch and first die of the second die and punch set; (e) the first die and punch set having a first die and a first punch engaged within the first punch for relative movement therebetween; (f) means for causing relative movement between the first punch and the first die of the first die and punch set; (g) the first punch movable within the first die of the first die and punch set to define a first chamber; (h) the first punch movable within the first die of the second die and punch set to define a second chamber; (i) the means of (b) movable to place the die and punch sets in the closed position with the first and second chambers in communication to form a closed mold cavity, and to capture a charge of powder therein; (j) the means of (f) movable in the closed position to move the first punch of the first die and punch set to transfer powder from the first chamber to the second chamber; (k) at least two of the means of (b), (d) and (f) co-operable to move the punches within the dies in the closed position to compact the powder; and (l) the means of (b), (d) and (f) co-operable to move the die and punch sets to the ejection position for ejecting the part.

Another aspect of the invention is a method for making compacted powder parts with a toolset including a pair of die and punch sets each having a die and an associated punch engageable therewithin to define respective chambers, the method comprising the sequential steps of: (a) establishing the tool set in a position in which the chambers are in closed communication to form a closed mold cavity with a charge of powder captured therein; (b) moving one of the punches to transfer at least a portion of the charge of powder from one of the chambers to the other of the chambers; (c) compacting the charge of powder to form a part; and (d) ejecting the part.

In a final aspect of the invention, step (a) includes moving the die and punch sets together to a position in which the one chamber is offset from the other chamber and in closed communication therewith to form the closed mold cavity.

BRIEF DESCRIPTION OF THE DRAWINGS

These and other objects and features of the invention shall now be described in relation to the following drawings.

FIG. 1a shows a representative view of a toolset of an embodiment of the present invention in which a toolset is shown in an open position;

FIG. 1b shows the toolset of FIG. 1a in a closed position;

FIG. 5(a)–(f) is a schematic representation similar to FIG. 1(a)–(d) of an alternative embodiment of toolset.

DESCRIPTION OF THE PREFERRED EMBODIMENT

Figure 1D:
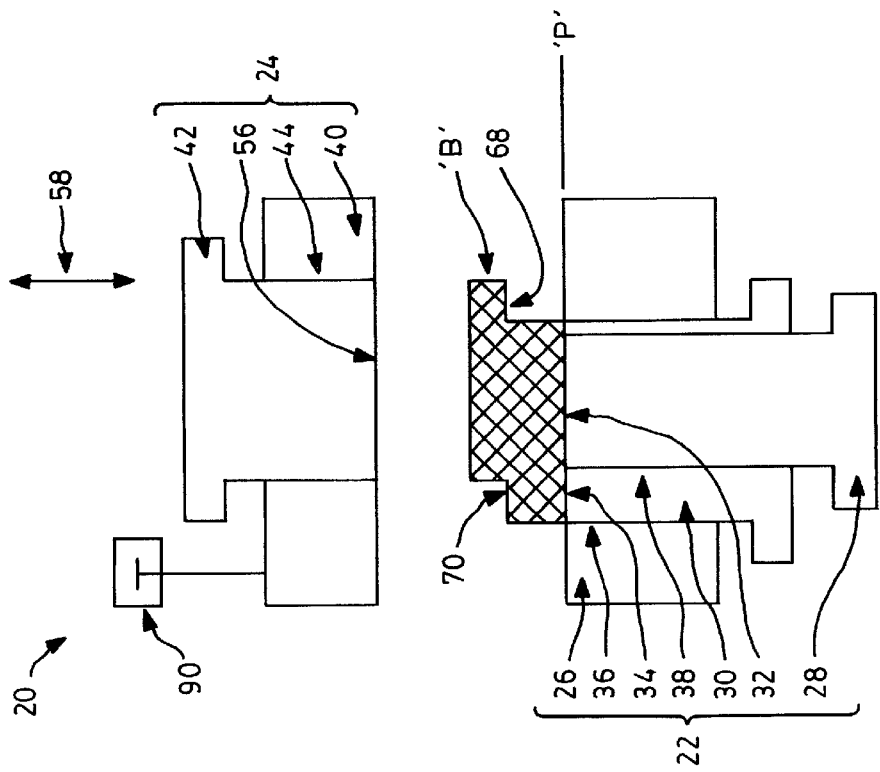
FIG. 1d shows the toolset of FIGS. 1a, 1b, and 1c in an ejection position.

Like parts shall be given like numbers throughout the description of an embodiment of the present invention, which follows:

A toolset illustrating an embodiment of the present invention is shown in FIGS. 1a, 1b, 1c, and 1d generally as 20. It includes a pair of die and punch sets, namely a first die and punch set shown generally as 22 and a second die and punch set shown generally as 24. First die and punch set 22 includes a die 26, a first punch 28, and a second punch 30, each having distal ends 32 and 34, respectively. Die 26 has an opening 36 of a size for receiving second punch 30 in sliding engagement therewithin. Second punch 30 in turn has an opening 38 of a size for receiving first punch 28 in sliding relationship. Thus first and second punches 28 and 30 are nested within die 26, with first punch 28 nested within second punch 30. Similarly, second die and punch set 24 includes a die 40 and a punch 42, die 40 having an opening 44 for receiving punch 42 in sliding relationship.

FIG. 1a shows toolset 20 in an open position in which second die and punch set 24 is separated from first die and punch set 22. A first chamber 46 is bounded by die 26 and first and second punches 28 and 30. First chamber 46 includes a first portion 48 within opening 38 and bounded by distal end 32 of first punch 28, and a second portion 50, being the remainder of first chamber 46. A charge of powder is indicated as 'A' within first chamber 46 by cross-hatching. Similarly, a second chamber 54 of second die and punch set 24 is defined as the space between die 40 and distal end 56 of punch 42. The position shown in FIG. 1a is a filling position.

FIG. 1b shows toolset 20 in a closed position in which second die and punch set 24 has been moved relative to first die and punch set 22 in a direction indicated by arrow 58. As can be inferred from the sequential positions of FIGS. 1a, 1b, 1c, and 1d, arrow 58 indicates the direction of reciprocation of toolset 20. In the closed position of FIG. 1b die 26 of first die and punch set 22 abuts die 40 of second die and punch set 24 at a parting interface indicated as 'P'. First chamber 46 is shown in closed communication with second chamber 54 to define a closed mold cavity 60, containing the charge of powder, 'A'.

In the closed position of FIG. 1b, first punch 28 has moved relative to second punch 30 to a position in which end 32 is shown flush with end 34, thereby displacing that amount of powder formerly contained within first portion 48. The position of second punch 30 relative to die 26, and hence the size of portion 50 remains as in FIG. 1a. First chamber 46 has thus been reduced in size by the amount displaced by first punch 28 in moving from the position of FIG. 1a to the position of FIG. 1b.

Second chamber 54 is indicated, by cross hatching, as containing that portion of charge of powder 'A' not remaining in first chamber 46, transferred across interface 'P' by the displacement of first punch 28. The closed position shown in FIG. 1b is a transfer position.

As may also be seen in FIG. 1b, opening 36, and hence first chamber 46, is offset from opening 44, and hence from second chamber 54, in a direction transverse to the direction of reciprocation indicated by arrow 58. The extent of this offset is indicated, on one side, by a first undercut 62, of a dimension indicated as 'E' and on the other side by a second undercut 64, of a dimension indicated as 'F'.

In the closed position shown in FIG. 1b, first chamber 46 communicates with second chamber 54 across a gap indicated as neck 66, and having a width of dimension 'G'. Dimension 'G' is equal to the width of opening 36 less dimension 'E' or, equivalently, the width of opening 44 less dimension 'F'. Distal end 32 of first punch 28 has a width of a dimension indicated as 'W'. In the embodiment illustrated, width 'G' of neck 66 is greater than width 'W' of end 32. Also in the embodiment illustrated, first punch 28 is located opposite neck 66 and aligned therewith such that end 32 would fall within a projection of neck 66 in the direction of arrow 58.

Figure 1C:
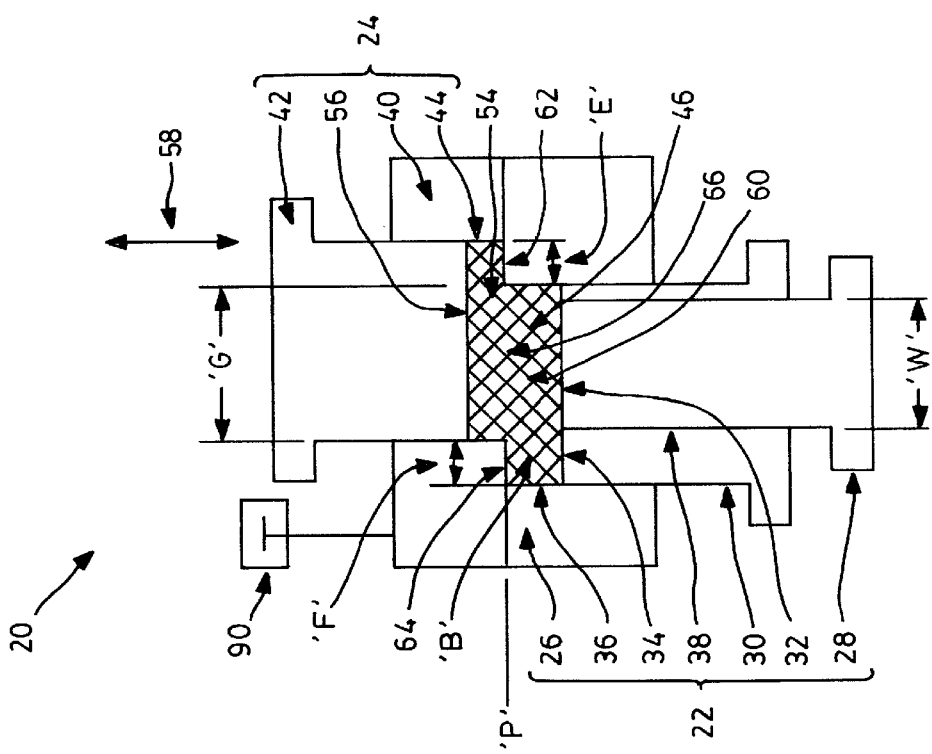
FIG. 1c shows the toolset of FIGS. 1a and 1b in a compaction position.

In FIG. 1c, toolset 20 is shown in a compaction position. Chambers 46 and 54 remain in closed communication, first and second punches 28 and 30 of first die and punch set 22 and punch 42 of second die and punch set 24 have been moved toward interface 'P' within dies 26 and 40, respectively, to compact charge of powder 'A' into a compacted part indicated generally with more closely spaced cross hatching as 'B'.

In FIG. 1d, toolset 20 has been separated at parting interface 'P' to expose part 'B' which has undercuts indicated as 68 and 70 which correspond to undercuts 62 and 64 of toolset 20 described above.

Figure 4:
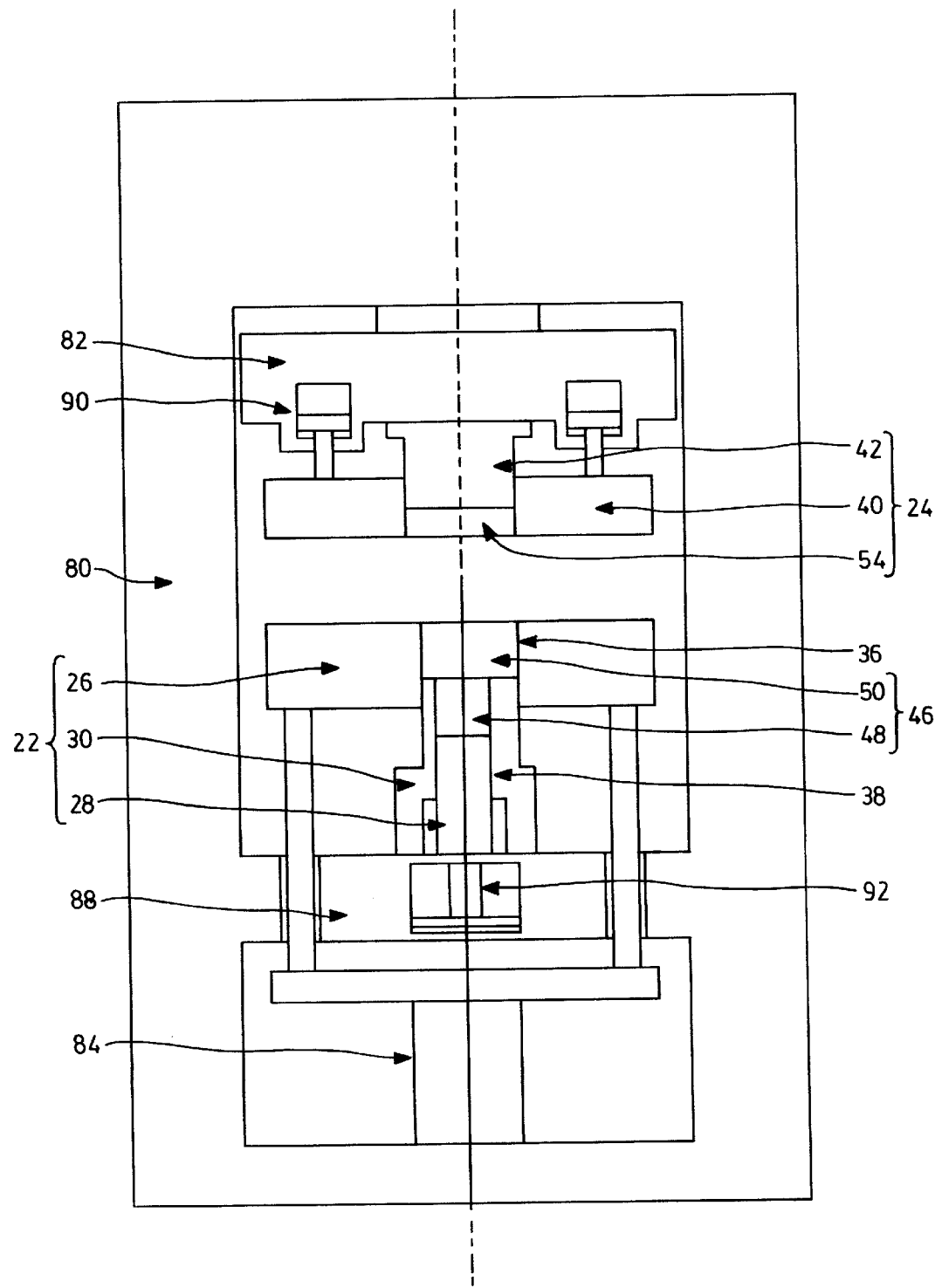
FIG. 4 is a front elevational view of the press.

As shown in FIG. 4, toolset 20 is utilized to compact a part 'B' out of powder material with an undercut 68 or 70 in a press 80. The press 80 is well known to those persons skilled in the art and includes an upper ram 82, lower ram 84 and press table 86 which is fixed relative the frame 88 of the press 80.

FIGS. 1(a)–(f) illustrates the toolset 20 which includes the top or upper die being die 40 of second die and punch set 24, a top or upper punch being punch 42 of second die and punch set 24, a bottom or lower die being die 26 of first die and punch set 22, and two bottom or lower punches being first and second punches 28 and 30 of first die and punch set 22.

Referring again to FIG. 4, the top die, die 40, has a drive system 90 which may comprise a hydraulic cylinder mounted to the upper ram 82 of a press 80. Accordingly, the top die is moveable relative the upper ram by means of the drive system 90. The top punch, being punch 40, is mounted on the upper ram 82 while the bottom die, being die 26, is driven by the lower ram 84 of the press 80. Moreover, at least one of the bottom punches shown in FIG. 4 as first punch 28 of first die and punch set 22, has a drive system which may consist of a hydraulic cylinder 92 mounted stationary relative to the frame 88 of the press 80.

The upper punch is associated with the upper die. In particular, the upper die has a hole, being opening 44, for receiving the upper punch for slidable relative motion therebetween.

The lower punches are mounted for relative slidable movement with the lower die. In particular, the lower die includes a hole, being opening 36, to receive punches 30 and 28 for relative slidable movement therebetween. Furthermore, punch 30 includes a hole, being opening 38, for slidably receiving punch 28. Punch 28 moves relative to punch 30 between the lowest position shown in FIG. 1a and the closed position shown in FIG. 1b. First chamber 46 includes a volume, being portion 48, which is defined by the volume displaced during the slidable relative movement of punch 28 relative to punch 30 from the position shown in FIG. 1b to that shown in FIG. 1a.

The upper die and lower die are adapted for relative movement between an open position as illustrated in FIG. 1a and a closed position as shown in FIG. 1b. In the open position, a feed box (not shown) moves over first chamber 46. In the position shown in FIG. 1a, first chamber 46 is defined by the space between die 26 and punches 30 and 28 when punch 30 is in its lowest position relative to die 26, and where the other punch 28 is in its lowest position relative to punch 30 as shown in FIG. 1a. The punch 28 is moved far enough down or in its lowest position that enough powder 'A' can be stored for the compaction of the part 'B'.

After filling of first chamber 46 the upper ram is moved down until the upper die is touching the lower die as shown in FIG. 1b for sealing of closed mould cavity 60. The lower die and punch 30 have not moved between the positions shown in FIG. 1a and 1b, as noted above.

Thereafter punch 28 travels upward to transfer the powder 'A' from the first portion 48 of first chamber 46 into the second chamber 54 in die 40 of second die and punch set 24. Second chamber 54 is defined by the upper die and upper punch. The upper die moves relative to the upper punch by means of the hydraulic cylinder 90 as best shown in FIG. 4.

FIG. 1b illustrates that second chamber 54 is offset from first chamber 46 in a direction perpendicular to the movement of the upper die relative the lower die (in other words the compaction direction), so as to produce said part 'A' with an undercut 68 or 70.

The compaction is shown in FIG. 1c and is accomplished by moving the upper ram 82 and both dies 26 and 40 with a suitable speed relationship downward. After compaction the part is ejected by withdrawing the top die upward and the lower die downward as shown in FIG. 1d.

It is possible to also have a stationary bottom die if the bottom punches are mounted to the lower ram of the press and are used for counter pressing and ejection.

FIG. 1d shows the ejection of the part 'B' when the dies 26 and 40 are in an eject position. The part 'B' has an undercut 68 or 70.

Figure 2:
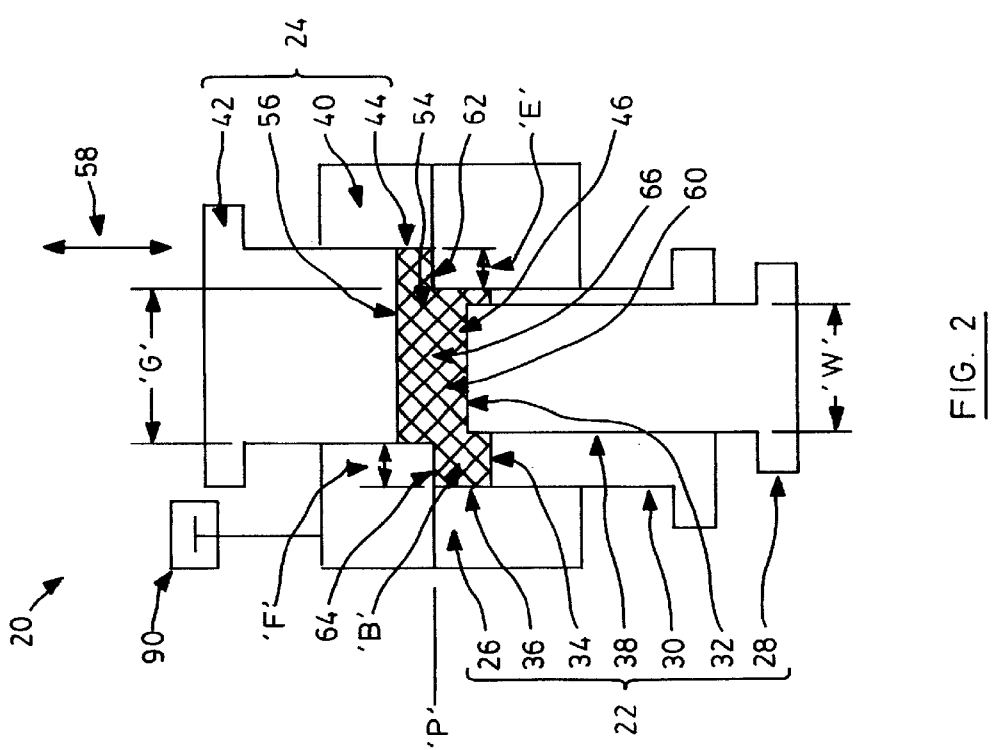
FIG. 2 is a representative view of the toolset of FIG. 1c in a position for making a compacted part having different levels on the lower surface.

The embodiment illustrated in FIGS. 1a through 1d shows the compaction of a single level part 'B' with an undercut 68 or 70. The invention is not limited thereto but can also be used for multi-level parts with an undercut by introducing necessary additional top and bottom punches. For example, FIG. 2 illustrates a part 'B' having multiple levels which is created by the each of punches 30 and 28 being at different levels. In such case the device and method shown herein is more advantageous since the bottom punch which transfers the powder into the top die can at the same time form one of the bottom levels of the part.

Figure 3:
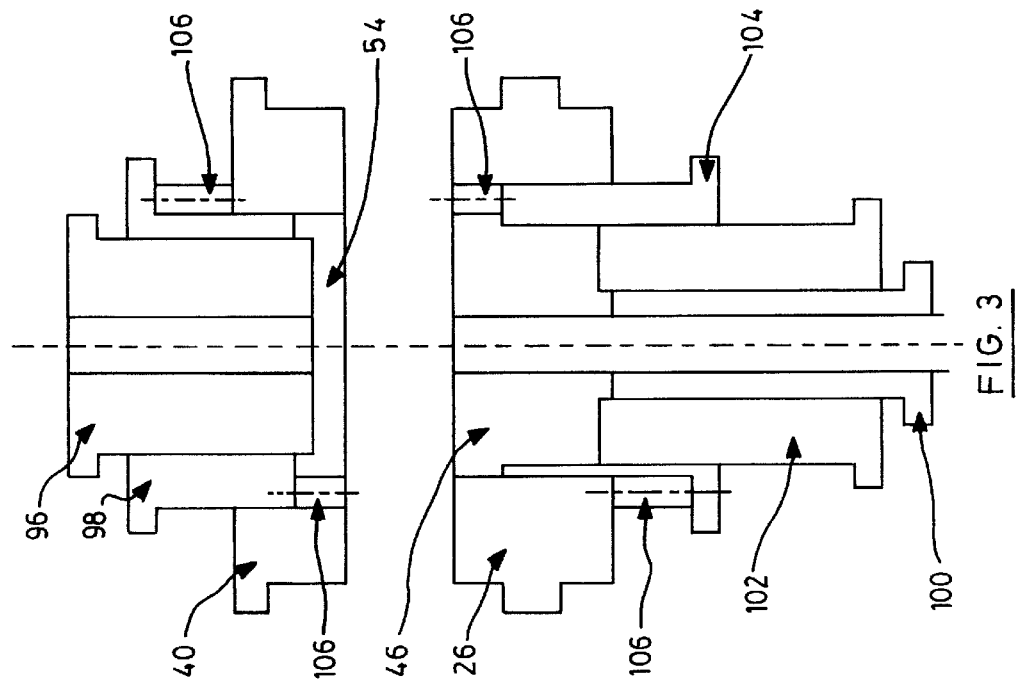
FIG. 3 is a schematic view of another embodiment of the invention showing the various two upper and three lower punches.

FIG. 3 illustrates another embodiment of the invention having several upper punches 96 and 98. Upper punch 98 could be stationary and upper punch 96 could be moved by suitable hydraulic cylinders. Moreover, FIG. 3 illustrates several lower punches 100, 102, and 104. Numeral 106 shows the pitch diameter of the tooth form within the punches and respective dies.

In order to conduct all necessary movements during the cycle with suitable precision and speeds and timing, a hydraulic press with closed loop controls is preferably used, although the invention is not limited thereto.

The drawings illustrate the withdrawal principal which means that after compaction the lower die is withdrawn to eject the part. However the invention described herein is also applicable for the counterpressing principle in which case the bottom die is stationary relative the press and all the bottom punches are mounted to the lower ram (including the drives to achieve relative movements between the bottom punches, if more than one bottom punch), so that after compaction the bottom punches will be moved further through the bottom die by the lower ram in order to eject the part.

It will be noted in the above embodiment that transfer of material is accomplished with a inch aligned with the void into which material is to be transferred. In this way local variations in density at undercut zones during filling and closure of the die is avoided.

An alternative embodiment is shown in FIG. 5 in which the dies are connected during filling and the punches subsequently inserted. Like reference numerals will be used to denote like components with a suffix 'a' added for clarity.

Referring therefore to FIG. 5, toolset 20a includes upper and lower die sets 22a, 24a respectively. Lower die set includes a pair of punches 28a, 30a that are adjustable relative to lower die 26a along the longitudinal axis.

Upper die set 24a includes a pair of punches 96a, 98a, similar to FIG. 3, that are each slidable along the longitudinal axis relative to the upper die 40a. The punches 96a, 98a are separable from the upper die 40a so that the dies 26a, 40a may be connected to one another and define a fillable chamber 46a indicated in FIG. 5a.

The volume of chamber 46a may be adjusted by varying the position of the punches 28a, 30a relative to die 26a to accommodate variations in the powder charge.

With the dies 26a, 40a connected, the chamber 46a is filled with powder charge by filling through the opening 44a. It will be noted that with the dies 26a, 40a connected the chamber 46a has an undercut portion indicated a 'u' which may cause bridging of the powder and reduced density when compacted.

After filling, the dies 26a, 40a are each moved upwardly relative to punches 28a, 30a causing powder to flow between the dies as shown in FIG. 5b. With the shoulder 62a provided by the offset E, powder may be carried upwardly with the die 26a to create a local high spot or hump above the shoulder 62a.

The punches 96a, 98a may then be inserted in opening 44a (FIG. 5c) with the centre punch 96a raised relative to the outer punch 98a until the outer punch is correctly spaced from the shoulder 62a. The staggering of the punches ensures that a void is provided at the centre of the chamber 46a to allow the powder above shoulder 62a to be displaced radially toward the axis of the die set. This radial displacement moves the powder into a zone at which the top and bottom punches 96a, 28a are juxtaposed, thereby ensuring the correct fill over the shoulder 62a.

To ensure that the bridging at undercut u is eliminated, the lower punch 28a and upper punch 96a are lowered relative to the lower punch 30a. At the same time, the dies 26a, 40a move downwardly relative to punch 30a until the punches and dies assume correct relative positions for initial compaction as shown in FIG. 5(d).

The relative movement of the punches and dies promotes transfer of the powder between the dies. This in turn promotes distribution of the powder into the undercut portion u to eliminate any voids and ensure correct powder content in the undercut area, as shown in FIG. 5(e). The dies 26a, 40a and upper punches 96a, 98a may then be moved relative to the lower punches 28a, 30a to compact the powder. The punches 96c, 98a and upper die 40a may then be separated (FIG. 5(f)) to permit withdrawal of the compacted component.

Although the preferred embodiment as well as the operation and use have been specifically described in relation to the drawings, it should be understood that variations in the preferred embodiment could he achieved by a person skilled in the trade without departing from the spirit of the invention as claimed herein.

We claim:

1. A toolset for a powder molding machine comprising a pair of opposed die and punch sets each having a die and a punch co-operating therewith to define respective chambers, said sets being positionable relative to one another to provide a closed position in which said chambers are in closed communication to form a closed mold cavity, one of said sets having a pair of nested punches with said punches being movable relative to one another from a filling position to a compaction position, wherein movement of said punch between said filling and said compaction positions transfers powder between said chambers.

2. The toolset of claim 1 wherein the other of said sets has a pair of punches and in said closed position said punches are offset from one another, and at least one of said punches is movable relative to its respective die to distribute said charge in said cavity.

3. A toolset as claimed in claim 1 wherein movement of said one punch from said filling position to said compaction position displaces to said other chamber a volume of powder corresponding substantially to the volume of said other chamber associated with the other punch and die set.

4. A toolset as claimed in claim 1 wherein each of said pair of die and punch sets has a plurality of punches nested within a die; each of said plurality of punches having an end for contacting the charge of powder; and each of said ends being movable to contact said powder material at different levels to distribute said charge within said cavity prior to compaction.

5. The toolset as claimed in claim 1 wherein at least one of said pair of die and punch sets has a plurality of punches nested within a die; each of said plurality of punches having an end for contacting the charge of powder; and each of said ends being movable to contact said powder material at different levels to produce said compacted part having different levels.

6. The toolset of claim 1 wherein said die and punch sets are relatively movable along an axis of reciprocation, and one of said chambers is offset in a direction transverse to said axis relative to the other of said chambers.

7. A toolset according to claim 2 wherein said punches of said other set are separated from the respective die during the filling of said chamber with said charge.

8. A toolset according to claim 7 wherein insertion of said punches into the respective die causes one of said punches to engage said charge and distribute it within said chamber.

* * * * *